United States Patent
Thewes

(10) Patent No.: US 6,234,661 B1
(45) Date of Patent: *May 22, 2001

(54) TRANSMISSION FOR A DOUBLE SCREW EXTRUDER WITH TWO TAPERING HELICAL SHAFTS

(75) Inventor: Helmut Thewes, Bocholt (DE)

(73) Assignee: A. Friedr. Flender AG, Bocholt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/452,520

(22) Filed: Dec. 1, 1999

(30) Foreign Application Priority Data

Dec. 8, 1998 (DE) .............................. 198 56 534

(51) Int. Cl.$^7$ ...................................................... B29B 7/80
(52) U.S. Cl. ........................................ 366/100; 74/665 H
(58) Field of Search ................................ 366/69, 83–85, 366/100, 297, 300, 301, 318; 425/204, 208, 209; 74/665 F, 665 G, 665 GA, 665 GD, 665 H

(56) References Cited

U.S. PATENT DOCUMENTS

| | | | |
|---|---|---|---|
| 1,322,464 | * | 11/1919 | Oden . |
| 2,466,934 | * | 4/1949 | Dellenbarger . |
| 3,124,061 | * | 3/1964 | Studli, Sr. . |
| 3,325,864 | * | 6/1967 | Kohyama et al. . |
| 3,605,188 | * | 9/1971 | McCormick et al. . |
| 3,824,875 | * | 7/1974 | Willert et al. .................... 74/665 GA |
| 3,894,725 | * | 7/1975 | Schafer ............................. 74/665 GA |
| 3,947,000 | * | 3/1976 | De Putter . |
| 4,261,225 | * | 4/1981 | Zahradnik ......................... 74/665 GA |
| 4,297,917 | * | 11/1981 | Bauer et al. ..................... 74/665 GD |
| 4,408,888 | * | 10/1983 | Hanslik ................................. 366/83 |
| 4,514,164 | * | 4/1985 | Poulin ................................... 425/208 |
| 4,586,219 | * | 5/1986 | Blach et al. ........................ 74/665 G |
| 4,586,402 | * | 5/1986 | Schafer ............................. 74/665 GA |
| 4,679,461 | * | 7/1987 | Mizuguchi et al. ............. 74/665 GA |
| 4,773,763 | * | 9/1988 | Weber .................................... 366/83 |
| 4,786,180 | * | 11/1988 | Chszaniecki et al. ................. 366/83 |
| 4,796,487 | * | 1/1989 | De Bernardi .................... 74/665 GA |
| 5,232,280 | * | 8/1993 | Moriyama ............................. 425/204 |
| 5,344,230 | * | 9/1994 | Kowalczyk et al. ................. 366/100 |
| 5,372,419 | * | 12/1994 | Hagiwara et al. .................... 366/100 |
| 5,415,473 | * | 5/1995 | Nakano et al. ......................... 366/83 |
| 5,483,852 | * | 1/1996 | Stuemky ............................... 366/297 |
| 5,511,874 | * | 4/1996 | Ikegami et al. ................. 74/665 GA |
| 5,803,597 | * | 9/1998 | Giani ..................................... 366/100 |
| 5,836,681 | * | 11/1998 | Giani ..................................... 366/100 |
| 6,106,426 | * | 8/2000 | Morhard et al. . |

FOREIGN PATENT DOCUMENTS

| | | | |
|---|---|---|---|
| 444470 | * | 3/1968 | (CH) . |
| 2261511 | * | 7/1973 | (DE) . |
| 2748918 | * | 5/1979 | (DE) .................................... 366/100 |
| 3612394 | * | 10/1987 | (DE) . |
| 3920422 | * | 1/1991 | (DE) . |
| 13693 | * | 9/1910 | (DK) . |
| 472431 | * | 2/1992 | (EP) .................................... 366/100 |
| 60-154030 | * | 8/1985 | (JP) . |
| 60-240430 | * | 11/1985 | (JP) . |
| 1-30610 | * | 6/1989 | (JP) . |

\* cited by examiner

*Primary Examiner*—Charles E. Cooley
(74) *Attorney, Agent, or Firm*—Max Fogiel

(57) ABSTRACT

A transmission for an extruder with two tapering helical shafts (1) consists of a driveshaft (6) driven by a transmission shaft and of two take-off shafts (3 & 4) that slope toward each other and can be coupled to the helical shafts. The transmission shaft and the take-off shafts are accommodated in the same housing (5). An angularly adjustable but rotationally rigid coupling is accommodated between the transmission shaft and the take-off shafts (3 & 4).

13 Claims, 3 Drawing Sheets

TRANSMISSION FOR A DOUBLE SCREW EXTRUDER WITH TWO TAPERING HELICAL SHAFTS

BACKGROUND OF THE INVENTION

The present invention concerns a transmission for an extruder with two tapering helical shafts.

A transmission of this genus is known from European Published Application 275 485. The shafts rotate in opposite senses and are connected to take-off shafts. A cogwheel is mounted on each take-off shaft. The cogwheels engage each other and distribute the force. Since the shafts slope toward each other, the cogwheels must be conical. Conical cogwheels, however, are more complicated and costly to manufacture than straight cogwheels. To ensure precise meshing of the extruder's threads, the cogwheel teeth must be precisely dimensioned to eliminate the need for expensive regrinding. They cannot be allowed to slip back and forth radially on the take-off shaft. The situation becomes even more complicated when both helical shafts are intended to rotate in the same sense and a third conical cogwheel is accordingly mounted between the other two.

Rotationally rigid compensating couplings (Taschenbuch für den Maschinenbau, Dubbel, 14th ed., 1981, 409) are generally employed when precisely angled transmission is necessary or when shafts are subject to errors in radial or angular alignment or to axial displacement. Cardan shafts and shafts with engaging cogs are examples.

An extruder with two parallel helical shafts is known from German OS 4 129 913. The transmission that distributes the force from the take-off shaft is separated from the processing section, which accommodates the helical shafts. The force that drives the latter is derived from the transmission by way of cardan shafts. This approach is intended to allow the transmission design to be independent of the narrow gap between the parallel helical shafts.

SUMMARY OF THE INVENTION

The object of the present invention is a simpler and less expensive transmission of the aforesaid genus for an extruder with two, tapering, helical shafts that rotate in opposite senses.

The take-off shafts in this transmission are not accommodated in the force-distribution section. There is accordingly no need for conical cogwheels, even though the helical shafts taper, and the force can be transmitted by straight cogwheels. Straight cogwheels are simpler to manufacture and can easily be mutually adjusted inside the transmission by means of a hydraulic pump. Since the rotating but rotationally rigid couplings inside the housing employ two sets of teeth, the overall transmission is very compact. Since the couplings are immersed in oil, however, there are no lubrication problems.

BRIEF DESCRIPTION OF THE DRAWINGS

The present invention will now be specified with reference to the accompanying drawing, wherein.

DESCRIPTION OF THE PREFERRED EMBODIMENTS

Figure 1:
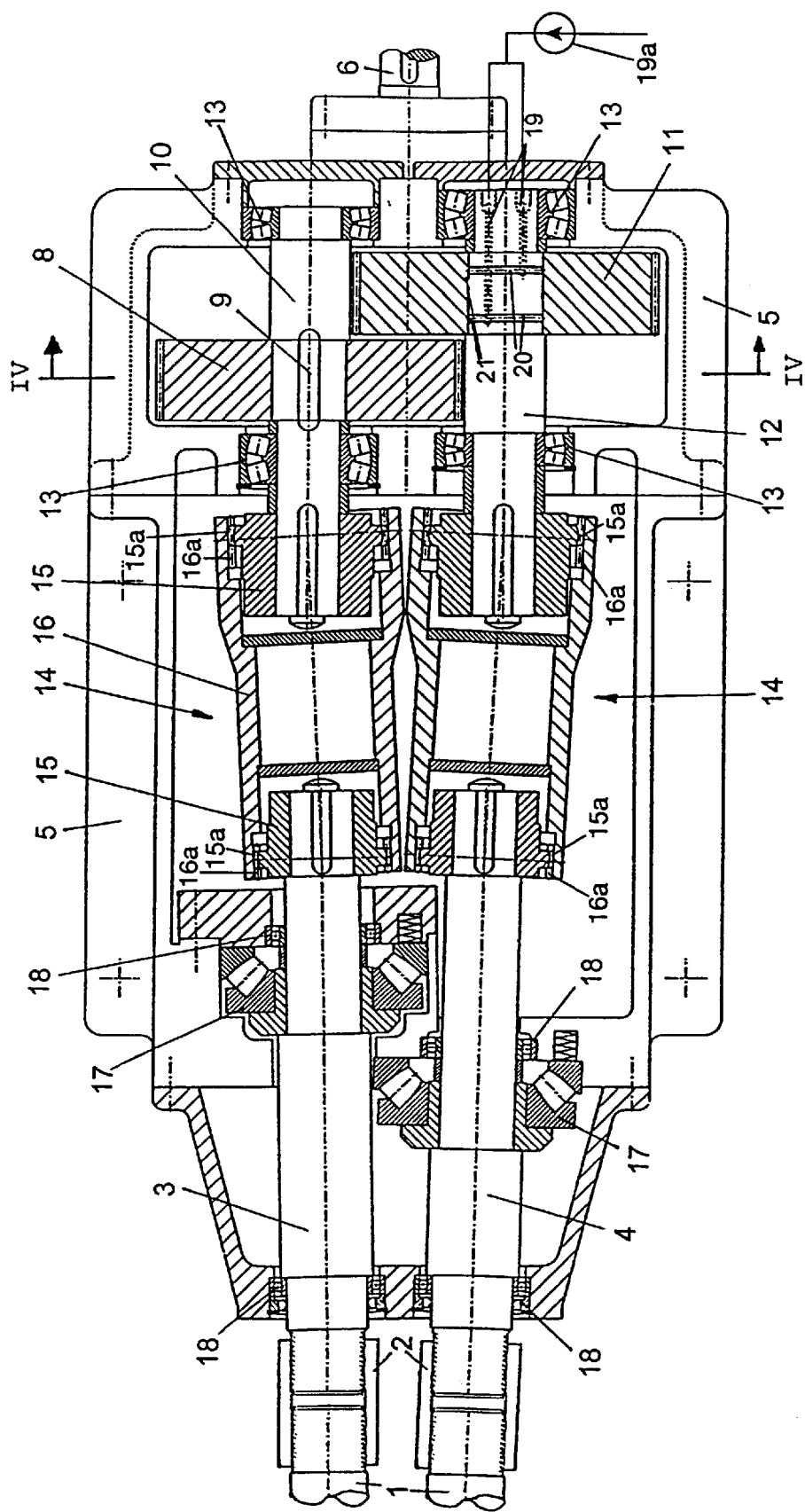
FIG. 1 is a longitudinal section through a transmission for an extruder with two tapering helical shafts, FIG. 2 a longitudinal section through another embodiment of the transmission, FIG. 3 a longitudinal section through the take-off shaft of the transmission illustrated in FIG. 1, FIG. 4 a view of the plane occupied by the cogwheels at the line IV—IV in FIG. 1, and FIG. 5 a view of the plane occupied by the cogwheels at the line V—V in FIG. 2.

The transmission drives an extruder with two tapering helical shafts 1 that slope toward each other. The figure illustrates only the ends of the shafts. The outer surfaces of the ends are provided with teeth. The ends of the shafts are connected to the transmission's take-off shafts 3 and 4 by sleeves 2 with teeth on the inner surface. The accordingly rigid connection slopes take off shafts 3 and 4 toward each other at the same angle as shafts 1.

The transmission is housed in a multiple oil-filled housing 5 and includes a driveshaft 6 that extends out of the housing and is driven by an unillustrated motor. A pinion 7 is mounted rotationally rigid around the transmission illustrated in FIG. 1 and meshes with two cogwheels 8 and 11. Cogwheel 8 is keyed into a transmission shaft 10 by a feather 9, and cogwheel 11 shrunk rotationally rigid to another transmission shaft 12 that parallels the first. Cogwheels 8 and 11 and pinion 7 are straight cogwheels and accommodated in bearings 13 in housing 5. The cogwheels are positioned to rotate transmission shafts 10 and 12 in the same sense. A coupling, specified hereinafter, between transmission shafts 10 and 12 and take-off shafts 3 and 4 rotates helical shafts 1 in the same sense as well.

Figure 2:
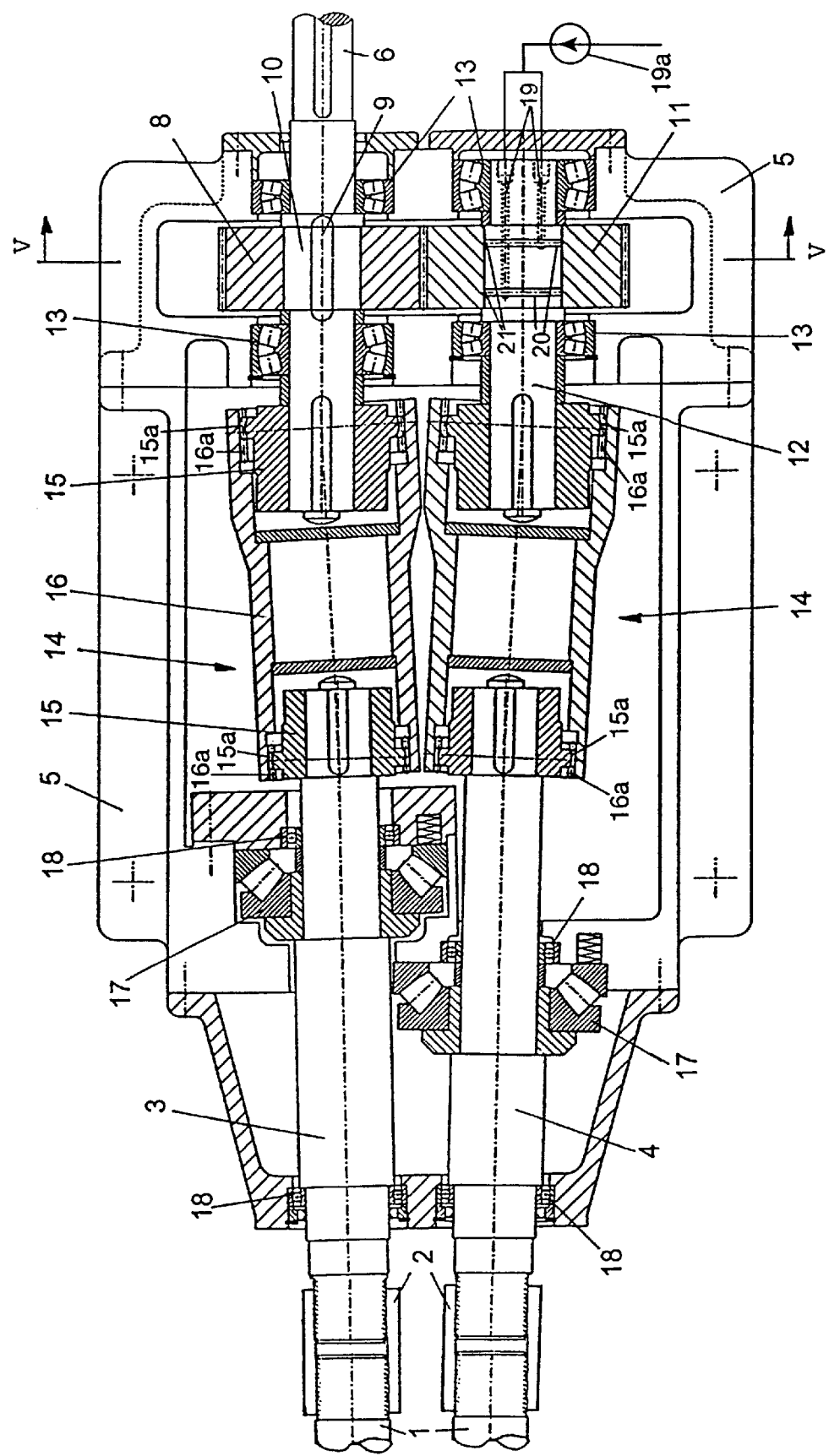
Figure 3:
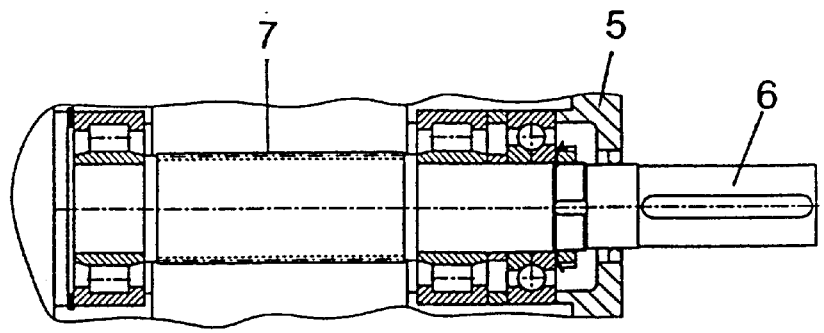
Figure 4:
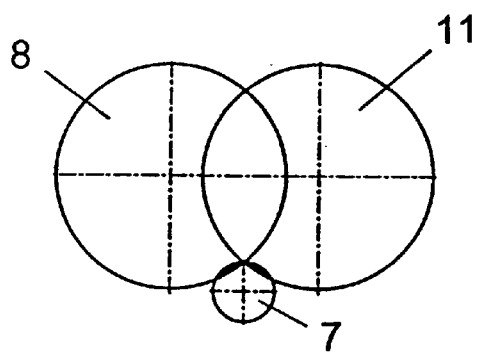
Figure 5:
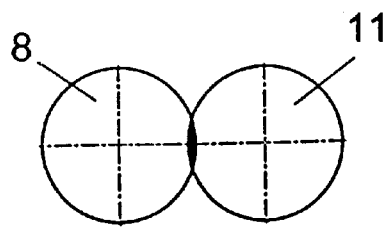

The transmission illustrated in FIG. 2 differs from the one illustrated in FIG. 1 only in that first transmission shaft 10 is coupled to the motor and accordingly acts as a driveshaft. The cogwheel 8 mounted on shaft 10 meshes with the cogwheel 11 mounted on second transmission shaft 12. Since transmission shafts 10 and 12 rotate in opposite senses, helical shafts 1 will do so as well.

The transmissions hereintofore specified act as force distributors and may be associated with upstream reduction gears.

Each parallel transmission shaft 10 and 12, whether rotating in the same sense as or in the opposite sense to its neighbor, is connected rotationally rigid but angularly adjustable to one of the two take-off shafts 3 and 4 that slope toward each other. The connection is embodied by couplings 14 with two sets of teeth accommodated inside housing 5. Each coupling 14 comprises two halves 15 secured rotationally rigid to the mutually facing ends of transmission shafts 10 and 12 and of take-off shafts 3 and 4. Coupling halves 15 are provided with a curving outer set of teeth 15a. This set is engaged by a set of teeth 16a on the inner surface of a sleeve 16 that extends along coupling halves 15. Coupling 14 is lubricated with the same oil that lubricates the bearings in housing 5.

Take-off shafts 3 and 4 are supported by axial bearings 17 in housing 5 and by radial bearings 18.

Axial bores 19 extend from the face of second transmission shaft 12 and into radial bores 20. Each radial bore 20 opens into an annular groove 21 in the seat of shrunken-on cogwheel 11. Bores 19 and 20 can be connected to a hydraulic pump 19a by opening housing 5. The pump forces highly compressed hydraulic fluid through the bores and into annular groove 21 in the shrink seat on second transmission shaft 12. The shrunken-on cogwheel 11 will accordingly be lifted off second transmission shaft 12 and rotated around it, allowing radial adjustment. Take-off shaft 4 can now be rotated relative to cogwheel 11 by way of the shaft's 4 connection to second transmission shaft 12 and with cogwheels 8 and 11 still engaged, until shaft 4 assumes a radial position with helical shafts 1. In the transmissions herein specified, only the cogwheel 11 on second transmission shaft 12 is provided with a pump, and cogwheel 8 is secured to first transmission shaft 10 by feather 9. It is, however, also possible to shrink cogwheel 8 onto first transmission shaft 10 and provide it with its own pump.

Thus, FIGS. 1 and 2 show the gear couplings 14 with the coupling halves 15, as well as the coupling sleeve 16 which extends over the coupling halves. The outer teeth of the coupling halves are curved.

Through the angular compensating coupling 14, the parallel drive shafts 10,12 are connected with the driven shafts 3,4 by an angle. The driven shafts 3,4 are connected through the same angle, to the threaded shafts 1. The object of the angular compensating coupling is to provide a parallel or axial displacement with respect to the connected shafts, as in the present invention, so as to compensate for an angular displacement of the shafts. The angular compensating coupling in form of a gear coupling 14 consists of two coupling halves 15 which are rotationally fixed on the ends of the shafts to be connected (drive shafts 10, 12 and driven shafts 3, 4).

The coupling halves 15 are provided with an outer set of teeth 15a which are curved.

The coupling halves 15 are gripped by a coupling sleeve 16. This coupling sleeve is provided on both ends with an internal set of teeth 16a which mesh with the outer set of teeth 15a of the coupling halves. In view of this gearing, the coupling sleeve 16 is positioned inclined and compensates thereby the angular displacement of the interconnected shafts. Sleeve 16 is an angularly movable element in the transmission which rotationally couples the angularly offset driving and driven shafts together. This results from the condition that outer set of teeth are curved and mesh with the inner set of teeth on sleeve 16.

In order to simplify the construction and fabrication equipment for producing the teeth, the present invention provides for use of spur and helical gears. For this purpose, the drive shafts 10,12 which carry the gears are parallel relative to one another. These parallel drive shafts 10,12 are connected with the driven shafts 3,4 through the angular compensation coupling. These driven shafts are arranged at an angle, and they are connected fixedly to the coaxial helical shafts.

Advantages of the present invention provide that the driven or output shafts are not dependent on dividing the power from one shaft (drive shaft) onto two shafts in the form of the helical shafts. As a result, it is possible to avoid bevel gears in the use of a double helical or screw extruder with conical shafts. At the same time, the dividing drive can be comprised of spur gears or helical gears. Spur gears are simpler to produce and can be installed in a simple manner within the drive through a hydraulic pump.

The drive, according to the present invention, becomes connected to a double screw extruder. The threads carried by the helical shafts of this double screw extruder must be positioned so that the threads mesh with one another in an optimum manner. The helical shafts 1 are connected fixedly with the driven shafts 3, 4 through geared connecting sleeves 2. This means that the driven shafts assume the same position as the helical shafts. Aside from this, the drive shafts 10, 12 must be positioned so that the gears 8, 11 on these drive shafts are in mesh. The driven shaft 4 is non-rotatably connected with the drive shaft 12. Due to fabrication tolerances it is possible that the driven shaft 4, through the connection with the drive shaft 12, no longer assumes such a radial position relative to the driven shaft 3, as is necessary for an optimum mesh of the helical shafts.

A pressurized fluid is forced into the mounting or seating of the gear 11 on the drive shaft 12, with the aid of the pump. As a result, the gear 11 can lift somewhat from the drive shaft 12. Whereas the gear 11 remains in mesh with the gear 8, there is no longer a connection between the gear 11 and the drive shaft 12. Accordingly, the drive shaft 12 and thereby also the driven shaft 4 are no longer blocked through the toothed mesh between the gears 8 and 11. The driven shaft 4 can now be rotated until it assumes a position relative to the driven shaft 3, which corresponds to the optimum position of the helical shafts. After this positioning, the gear becomes again secured to the drive shaft after removal of the pressurized fluid.

What is claimed is:

1. A transmission for a double screw extruder with two tapering screw-threaded shafts; a drive shaft and two transmission shafts driven by said drive shaft; said transmission shafts having parallel axes; two output shafts; rotationally rigid couplings connecting said transmission shafts to said output shafts; said output shafts sloping toward each other and being rotationally rigidly coupled to said tapering screw-threaded shafts; a common housing for said transmission shafts, said output shafts and said couplings; said couplings being gear couplings; each of said gear couplings having two coupling parts each with an outer curved set of teeth and a sleeve with two inner sets of teeth covering said coupling parts, said outer curved set of teeth on said coupling parts meshing with said inner sets of teeth on said sleeve; said coupling parts being secured rotationally rigid to mutually facing ends of said output shafts and said transmission shafts, said couplings compensating against angular displacement of said transmission shafts with respect to said output shafts.

2. A transmission as defined in claim 1, wherein said coupling parts comprise coupling halves.

3. A transmission as defined in claim 1, wherein said transmission shafts comprise spur gears.

4. A transmission as defined in claim 1, including at least one spur gear seated on an associated transmission shaft by shrinking and being adjustable by a hydraulic pump.

5. A transmission as defined in claim 1, wherein said output shafts rotate in the same direction.

6. A transmission as defined in claim 1, wherein said output shafts rotate in opposite directions.

7. A transmission for a double screw extruder with two tapering screw-threaded shafts; a drive shaft and two gear shafts driven by said drive shaft; said gear shafts having parallel axes; two output shafts; rotationally rigid couplings connecting said gear shafts to said output shafts; said output shafts sloping toward each other and being rotationally rigidly coupled to said tapering screw-threaded shafts; a common housing for said gear shafts, said output shafts and said couplings; said couplings being gear couplings; each of said gear couplings having two coupling parts each with an outer curved set of teeth and a sleeve with two inner sets of teeth covering said coupling parts, said outer curved set of teeth on said coupling parts meshing with said inner sets of teeth on said sleeve; said coupling parts being secured rotationally rigid to mutually facing ends of said output shafts and said gear shafts, said couplings compensating against angular displacement of said gear shafts with respect to said output shafts.

8. A transmission as defined in claim 7, wherein said coupling parts comprise coupling halves.

9. A transmission as defined in claim 7, wherein said gear shafts comprise spur gears.

10. A transmission as defined in claim 7, including at least one spur gear seated on an associated gear shaft by shrinking and being adjustable by a hydraulic pump.

11. A transmission as defined in claim 7, wherein said output shafts rotate in the same direction.

12. A transmission as defined in claim 7, wherein said output shafts rotate in opposite directions.

13. A transmission for a double screw extruder with two tapering screw-threaded shafts; a drive shaft and two gear shafts driven by said drive shaft; said gear shafts having parallel axes; two output shafts; rotationally rigid couplings connecting said gear shafts to said output shafts; said output shafts sloping toward each other and being rotationally rigidly coupled to said tapering screw-threaded shafts; a common housing for said gear shafts, said output shafts and said couplings; said couplings being gear couplings; each of said gear couplings having two coupling parts each with an outer curved set of teeth and a sleeve with two inner sets of teeth covering said coupling parts, said outer curved set of teeth on said coupling parts meshing with said inner sets of teeth on said sleeve; said coupling parts being secured rotationally rigid to mutually facing ends of said output shafts and said gear shafts, said couplings compensating against angular displacement of said gear shafts with respect to said output shafts; said two gear shafts comprising spur gears; said coupling parts comprising coupling halves; at least one of said spur gears being seated on an associated gear shaft by shrinking and being adjustable by a hydraulic pump; said output shafts rotating in the same direction.

* * * * *